US012793623B2

(12) United States Patent
An et al.

(10) Patent No.: US 12,793,623 B2
(45) Date of Patent: Nov. 10, 2026

(54) PIXEL HAVING AN INITIALIZATION PERIOD WHEREIN A POWER VOLTAGE TRANSITIONS FROM A HIGH LEVEL TO A LOW LEVEL, DISPLAY DEVICE INCLUDING THE PIXEL, AND ELECTRONIC APPARATUS INCLUDING THE DISPLAY DEVICE

(71) Applicant: Samsung Display Co., Ltd., Yongin-Si (KR)

(72) Inventors: Jongyeop An, Yongin-si (KR); HyunJoon Kim, Yongin-si (KR); Youngwan Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/276,030

(22) Filed: Jul. 22, 2025

(65) Prior Publication Data

US 2026/0031028 A1 Jan. 29, 2026

(30) Foreign Application Priority Data

Jul. 26, 2024 (KR) ........................ 10-2024-0099270
Nov. 4, 2024 (KR) ........................ 10-2024-0154000

(51) Int. Cl.
*G09G 3/32* (2016.01)

(52) U.S. Cl.
CPC ....... *G09G 3/32* (2013.01); *G09G 2300/0465* (2013.01); *G09G 2300/0819* (2013.01); *G09G 2300/0852* (2013.01); *G09G 2300/0861* (2013.01); *G09G 2310/0267* (2013.01); *G09G 2310/08* (2013.01); *G09G 2330/023* (2013.01)

(58) Field of Classification Search
CPC ............. G09G 3/32; G09G 2300/0465; G09G 2300/0819; G09G 2300/0852; G09G 2300/0861; G09G 2310/0267; G09G 2310/08; G09G 2330/023; G09G 3/3233
See application file for complete search history.

(56) References Cited

U.S. PATENT DOCUMENTS 11,552,063 B2 1/2023 Kim et al.
11,651,733 B1 * 5/2023 Sun ...................... G09G 3/3233 345/212
2017/0132975 A1 * 5/2017 Park ..................... G09G 3/3233
2017/0200414 A1 * 7/2017 Li ........................ G09G 3/3266
2018/0190197 A1 * 7/2018 Chang ................ H10K 59/1216
(Continued)

*Primary Examiner* — Rodney Amadiz
(74) *Attorney, Agent, or Firm* — Innovation Counsel LLP

(57) ABSTRACT

A pixel includes a first transistor including a gate connected to a first node, a first terminal connected to a second node, and a second terminal connected to a third node, a second transistor which transmits a data signal to the first node in response to a write gate signal, a third transistor which transmits a sustain voltage to the third node in response to a compensation gate signal, a fourth transistor which transmits a first power voltage to the second node in response to an emission signal, a first capacitor connected between the first node and the second node, a second capacitor connected between the second node and a power line which transmits the first power voltage, and a light-emitting element including a first terminal connected to the third node and a second terminal which receives a second power voltage.

19 Claims, 11 Drawing Sheets

(56) References Cited

U.S. PATENT DOCUMENTS

| | | | | |
|---|---|---|---|---|
| 2019/0385527 | A1* | 12/2019 | Mao | G09G 3/3233 |
| 2022/0173189 | A1* | 6/2022 | Kim | G09G 3/325 |
| 2022/0189397 | A1* | 6/2022 | Cao | G09G 3/3233 |
| 2023/0317006 | A1* | 10/2023 | Kim | G09G 3/3233<br>345/690 |

* cited by examiner

PIXEL HAVING AN INITIALIZATION PERIOD WHEREIN A POWER VOLTAGE TRANSITIONS FROM A HIGH LEVEL TO A LOW LEVEL, DISPLAY DEVICE INCLUDING THE PIXEL, AND ELECTRONIC APPARATUS INCLUDING THE DISPLAY DEVICE

CROSS-REFERENCE TO RELATED APPLICATION(S)

This application claims priority under 35 USC § 119 to Korean Patent Application No. 10-2024-0099270 filed on Jul. 26, 2024 and Korean Patent Application No. 10-2024-0154000 filed on Nov. 4, 2024, in the Korean Intellectual Property Office (KIPO), the entire disclosures of which are incorporated by reference herein.

BACKGROUND

1. Field

Embodiments relate to a display device. More particularly, embodiments relate to a pixel including a plurality of transistors and a plurality of capacitors, a display device including the pixel, and an electronic apparatus including the display device.

2. Description of the Related Art

A display device may include a plurality of pixels that display a plurality of colors, respectively. Each of the pixels may be a minimum unit that displays one color, and the display device may display an image in which colors displayed by the pixels are combined.

Recently, a demand for a display device with a high resolution has been increasing. In order to increase the resolution of the display device, an area of the pixel needs to be reduced.

SUMMARY

Embodiments provide a pixel with a reduced area.

Embodiments provide a display device with having a high resolution and an electronic apparatus including the display device.

A pixel according to embodiments includes a first transistor including a gate connected to a first node, a first terminal connected to a second node, and a second terminal connected to a third node, a second transistor which transmits a data signal to the first node in response to a write gate signal, a third transistor which transmits a sustain voltage to the third node in response to a compensation gate signal, a fourth transistor which transmits a first power voltage to the second node in response to an emission signal, a first capacitor connected between the first node and the second node, a second capacitor connected between the second node and a power line which transmits the first power voltage, and a light-emitting element including a first terminal connected to the third node and a second terminal which receives a second power voltage.

In an embodiment, in an initialization period, the first power voltage may transition from a high level to a low level, the second power voltage may transition from a low level to a high level, and the compensation gate signal may transition from a deactivation level to an activation level, and the emission signal may have an activation level.

In an embodiment, the first power voltage may be applied to the third node through the fourth transistor and the first transistor in the initialization period.

In an embodiment, in a compensation period after the initialization period, the write gate signal may have an activation level, the sustain voltage may have a high level, the compensation gate signal may transition from the activation level to the deactivation level, the emission signal may transition from the activation level to a deactivation level, and the data signal may have a reference voltage.

In an embodiment, the first capacitor may store a threshold voltage of the first transistor in the compensation period.

In an embodiment, in an addressing period after the compensation period, the write gate signal may include a pulse having the activation level, and the data signal may have a data voltage.

In an embodiment, in a bypass period after the addressing period, the sustain voltage may have a low level, and the compensation gate signal may have the activation level.

In an embodiment, in an emission period after the bypass period, the first power voltage may have the high level, the second power voltage may have the low level, and the emission signal may have the activation level.

In an embodiment, in an initialization period, the first power voltage may transition from a high level to a low level, the second power voltage may transition from a low level to a high level, the sustain voltage may have a low level, the compensation gate signal may transition from a deactivation level to an activation level, and the emission signal may have a deactivation level.

In an embodiment, the sustain voltage may be applied to the third node through the third transistor in the initialization period.

In an embodiment, each of the first transistor, the second transistor, the third transistor, and the fourth transistor may be a p-type metal oxide semiconductor (PMOS) transistor.

In an embodiment, the first transistor may be a p-type metal oxide semiconductor (PMOS) transistor, and at least one of the second transistor, the third transistor, and the fourth transistor may be an n-type metal oxide semiconductor (NMOS) transistor.

In an embodiment, the display device may further include a fifth transistor which transmits an initialization voltage to the second node in response to an initialization gate signal.

In an embodiment, in an initialization period, the first power voltage may transition from a high level to a low level, the second power voltage may transition from a low level to a high level, the compensation gate signal may transition from a deactivation level to an activation level, the emission signal may have a deactivation level, and the initialization gate signal may have an activation level.

In an embodiment, the initialization voltage may be applied to the third node through the fifth transistor and the first transistor in the initialization period.

A display device according to embodiments includes a display panel including a plurality of pixels, a gate driver which provides a write gate signal, a compensation gate signal, and an emission signal to each of the pixels, a data driver which provides a data signal to each of the pixels, and a power management circuit which provides a first power voltage, a second power voltage, and a sustain voltage to each of the pixels. Each of the pixels may include a first transistor including a gate connected to a first node, a first terminal connected to a second node, and a second terminal connected to a third node, a second transistor which transmits the data signal to the first node in response to the write gate signal, a third transistor which transmits the sustain voltage to the third node in response to the compensation gate signal, a fourth transistor which transmits the first power voltage to the second node in response to the emission signal, a first capacitor connected between the first node and the second node, a second capacitor connected between the second node and a power line which transmits the first power voltage, and a light-emitting element including a first terminal connected to the third node and a second terminal which receives the second power voltage.

In an embodiment, the gate driver may sequentially provide the write gate signal to pixel rows, and may commonly provide the compensation gate signal and the emission signal to the pixel rows. The power management circuit may commonly provide the first power voltage to the pixel rows.

In an embodiment, the gate driver may sequentially provide the write gate signal, the compensation gate signal, and the emission signal to pixel rows. The power management circuit may sequentially provide the first power voltage to the pixel rows.

In an embodiment, the gate driver may further provide an initialization gate signal to each of the pixels. The power management circuit may further provide an initialization voltage to each of the pixels. Each of the pixels may further include a fifth transistor which transmits the initialization voltage to the second node in response to the initialization gate signal.

An electronic apparatus according to embodiments includes a display panel including a plurality of pixels, a gate driver which provides a write gate signal, a compensation gate signal, and an emission signal to each of the pixels, a data driver which provides a data signal to each of the pixels, a power management circuit which provides a first power voltage, a second power voltage, and a sustain voltage to each of the pixels, a controller which controls the gate driver, the data driver, and the power management circuit, and a processor which provides input image data and a control signal to the controller. Each of the pixels includes a first transistor including a gate connected to a first node, a first terminal connected to a second node, and a second terminal connected to a third node, a second transistor which transmits the data signal to the first node in response to the write gate signal, a third transistor which transmits the sustain voltage to the third node in response to the compensation gate signal, a fourth transistor which transmits the first power voltage to the second node in response to the emission signal, a first capacitor connected between the first node and the second node, a second capacitor connected between the second node and a power line which transmits the first power voltage, and a light-emitting element including a first terminal connected to the third node and a second terminal which receives the second power voltage.

The pixel according to the embodiments includes only four or five transistors and two capacitors, so that the area of the pixel may be reduced.

The display device according to the embodiments includes the pixels having a small area, so that the resolution of the display device may increase.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
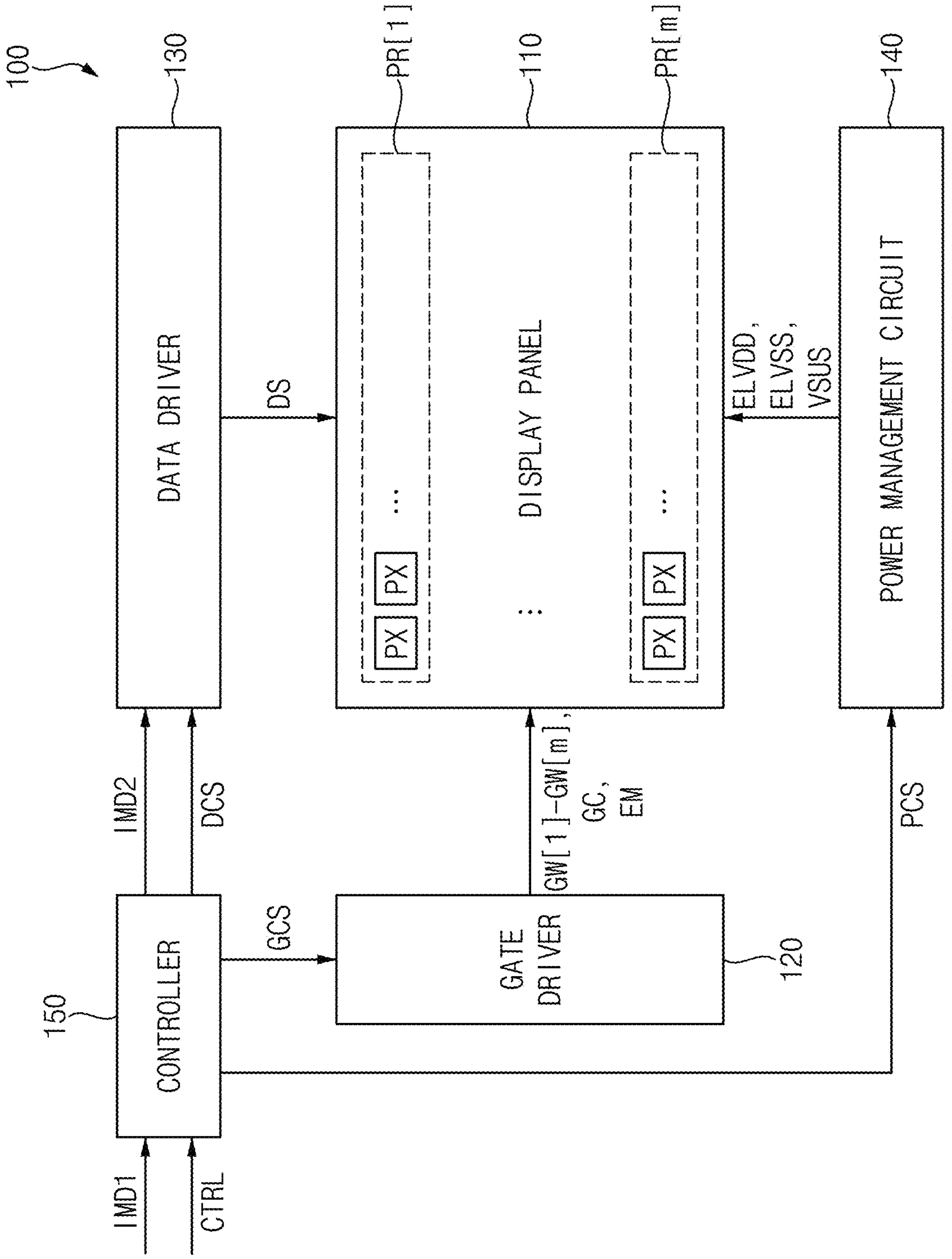
FIG. 1 is a block diagram showing a display device according to an embodiment.

Hereinafter, a pixel, a display device, and an electronic apparatus according to embodiments of the present disclosure will be described in more detail with reference to the accompanying drawings. The same or similar reference numerals will be used for the same elements in the accompanying drawings.

FIG. 1 is a block diagram showing a display device 100 according to an embodiment.

Referring to FIG. 1, the display device 100 may include a display panel 110, a gate driver 120, a data driver 130, a power management circuit 140, and a controller 150.

The display panel 110 may include a plurality of pixels PX. The display panel 110 may include first to $m^{th}$ (m is a natural number greater than 1) pixel rows PR[1]-PR[m] defined by the pixels PX.

The gate driver 120 may provide first to $m^{th}$ write gate signals GW[1]-GW[m], a compensation gate signal GC, and an emission signal EM to the pixels PX. The gate driver 120 may generate the first to $m^{th}$ write gate signals GW[1]-GW[m], the compensation gate signal GC, and the emission signal EM based on a gate control signal GCS. The gate control signal GCS may include a gate clock signal, a gate start signal, etc.

The gate driver 120 may sequentially provide the first to $m^{th}$ write gate signals GW[1]-GW[m] to the first to $m^{th}$ pixel rows PR[1]-PR[m]. In other words, the gate driver 120 may provide the first write gate signal GW[1] to the first pixel row PR[1], and may provide the $m^{th}$ write gate signal GW[m] to the $m^{th}$ pixel row PR[m]. The gate driver 120 may commonly provide the compensation gate signal GC and the emission signal EM to the first to $m^{th}$ pixel rows PR[1]-PR[m].

The data driver 130 may provide data signals DS to the pixels PX. The data driver 130 may generate the data signals DS based on output image data IMD2 and a data control signal DCS. The data driver 130 may convert the output image data IMD2 in a digital form into the data signals DS in an analog form. The data control signal DCS may include a data clock signal, a load signal, an output data enable signal, etc.

The power management circuit 140 may provide a first power voltage ELVDD, a second power voltage ELVSS, and a sustain voltage VSUS to the pixels PX. The power management circuit 140 may generate the first power voltage ELVDD, the second power voltage ELVSS, and the sustain voltage VSUS based on a power control signal PCS. The power management circuit 140 may commonly provide the first power voltage ELVDD, the second power voltage ELVSS, and the sustain voltage VSUS to the first to $m^{th}$ pixel rows PR[1]-PR[m].

The controller 150 may control the gate driver 120, the data driver 130, and the power management circuit 140. The controller 150 may provide the gate control signal GCS to the gate driver 120, may provide the output image data IMD2 and the data control signal DCS to the data driver 130, and may provide the power control signal PCS to the power management circuit 140. The controller 150 may convert input image data IMD1 into the output image data IMD2. The controller 150 may generate the gate control signal GCS, the data control signal DCS, and the power control signal PCS based on a control signal CTRL. The control signal CTRL may include a vertical sync signal, a horizontal sync signal, a master clock signal, an input data enable signal, etc.

Figure 2:
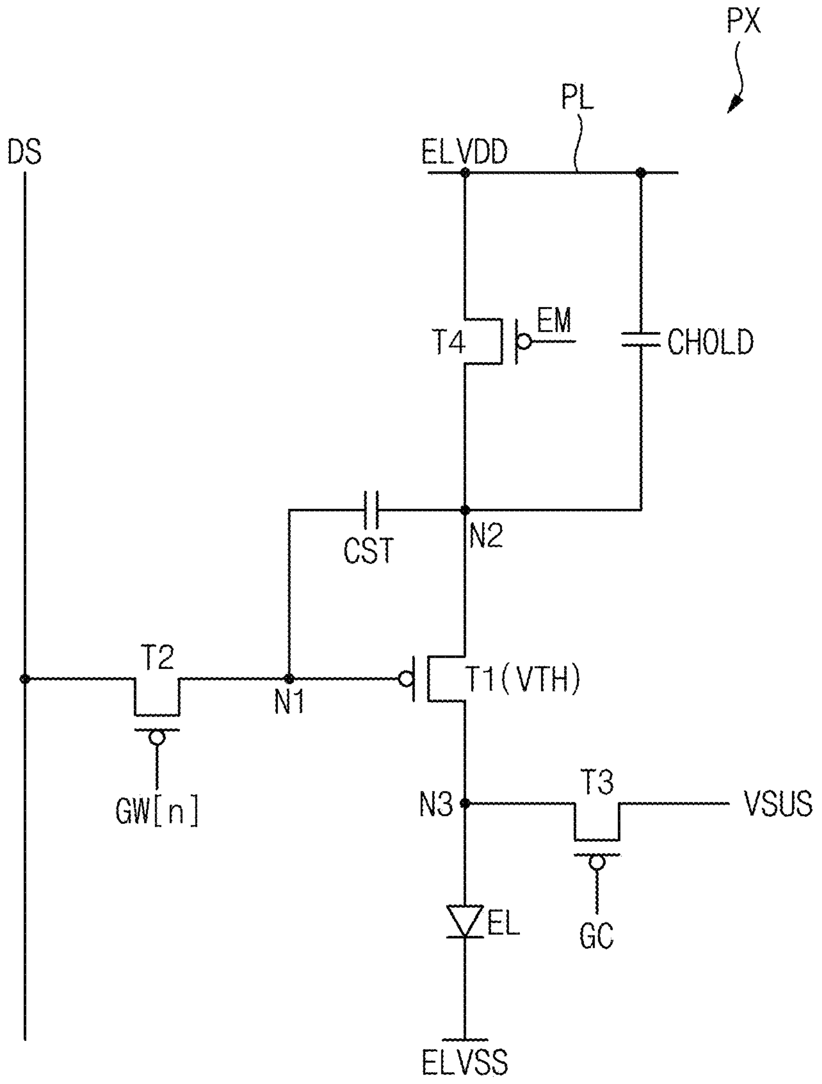
FIG. 2 is a circuit diagram showing an example of a pixel of FIG. 1.

FIG. 2 is a circuit diagram showing an example of the pixel PX of FIG. 1.

Referring to FIGS. 1 and 2, the pixel PX may receive a write gate signal GW[n] (n is a natural number greater than or equal to 1 and less than or equal to m), the compensation gate signal GC, the emission signal EM, a data signal DS, the first power voltage ELVDD, the second power voltage ELVSS, and the sustain voltage VSUS. The write gate signal GW[n] may be one of the first to $m^{th}$ write gate signals GW[1]-GW[m].

The pixel PX may include a first transistor T1, a second transistor T2, a third transistor T3, a fourth transistor T4, a first capacitor CST, a second capacitor CHOLD, and a light-emitting element EL.

The first transistor T1 may include a gate connected to a first node N1, a first terminal connected to a second node N2, and a second terminal connected to a third node N3. The first transistor T1 may generate a driving current corresponding to a voltage difference between the first node N1 and the second node N2.

The second transistor T2 may transmit the data signal DS to the first node N1 in response to the write gate signal GW[n]. The second transistor T2 may include a gate that receives the write gate signal GW[n], a first terminal that receives the data signal DS, and a second terminal connected to the first node N1.

The third transistor T3 may transmit the sustain voltage VSUS to the third node N3 in response to the compensation gate signal GC. The third transistor T3 may include a gate that receives the compensation gate signal GC, a first terminal that receives the sustain voltage VSUS, and a second terminal connected to the third node N3.

The fourth transistor T4 may transmit the first power voltage ELVDD to the second node N2 in response to the emission signal EM. The fourth transistor T4 may include a gate that receives the emission signal EM, a first terminal that receives the first power voltage ELVDD, and a second terminal connected to the second node N2.

Each of the first transistor T1, the second transistor T2, the third transistor T3, and the fourth transistor T4 may be a p-type metal oxide semiconductor (PMOS) transistor. Each of the first transistor T1, the second transistor T2, the third transistor T3, and the fourth transistor T4 may be a polycrystalline silicon transistor.

The first capacitor CST may be connected between the first node N1 and the second node N2. The first capacitor CST may include a first terminal connected to the first node N1 and a second terminal connected to the second node N2. The first capacitor CST may store a voltage difference between the first node N1 and the second node N2.

The second capacitor CHOLD may be connected between the second node N2 and a power line PL that transmits the first power voltage ELVDD. The second capacitor CHOLD may include a first terminal connected to the second node N2 and a second terminal that receives the first power voltage ELVDD. The second capacitor CHOLD may store a voltage of the second node N2.

The light-emitting element EL may include a first terminal (e.g., an anode) connected to the third node N3 and a second terminal (e.g., a cathode) that receives the second power voltage ELVSS. The light-emitting element EL may emit light with a luminance corresponding to the driving current generated by the first transistor T1.

The pixel PX according to the present embodiment includes only four transistors and two capacitors, so that an area of the pixel PX may be reduced. Further, the display device 100 according to the present embodiment includes the pixels PX having a small area, so that a resolution of the display device 100 may increase.

Figure 3:
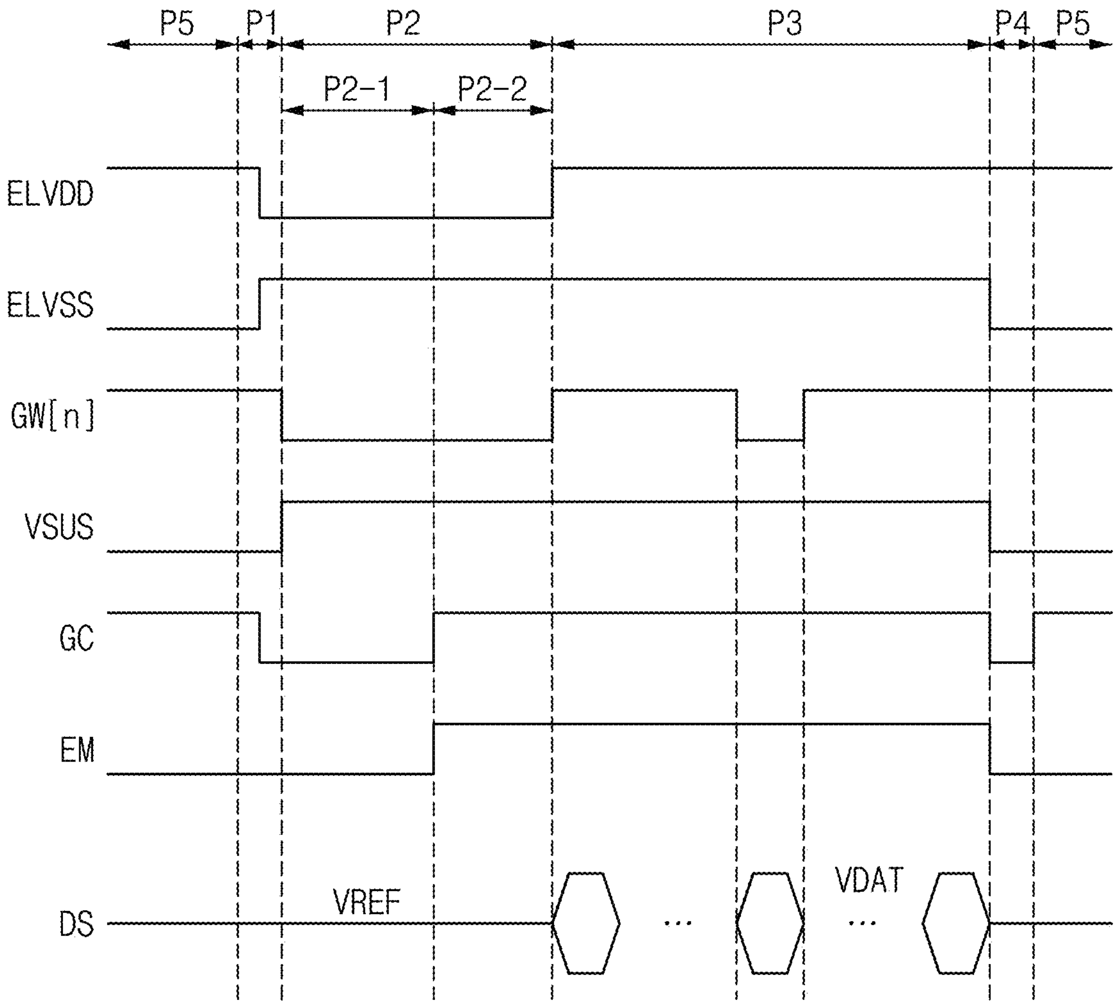
FIG. 3 is a timing diagram showing an example of voltages and signals of FIG. 2.

FIG. 3 is a timing diagram showing an example of voltages ELVDD, ELVSS, and VSUS and signals GW[n], GC, EM, and DS of FIG. 2.

Referring to FIGS. 2 and 3, a frame period corresponding to one image frame may include an initialization period P1, a compensation period P2, an addressing period P3, a bypass period P4, and an emission period P5. The initialization period P1, the compensation period P2, the addressing period P3, the bypass period P4, and the emission period P5 may be sequentially performed.

The first power voltage ELVDD may transition from a high level to a low level in the initialization period P1, may have the low level in the compensation period P2, and may have the high level in the addressing period P3, the bypass period P4, and the emission period P5. The second power voltage ELVSS may transition from a low level to a high level in the initialization period P1, may have the high level in the compensation period P2 and the addressing period P3, and may have the low level in the bypass period P4 and the emission period P5.

The write gate signal GW[n] may have a deactivation level in the initialization period P1, may have an activation level in the compensation period P2, may include a pulse having the activation level in the addressing period P3, and may have the deactivation level in the bypass period P4 and the emission period P5. The data signal DS may have a reference voltage VREF in the initialization period P1, the compensation period P2, the bypass period P4, and the emission period P5, and may have a data voltage VDAT in the addressing period P3.

The sustain voltage VSUS may have a low level in the initialization period P1, may have a high level in the compensation period P2 and the addressing period P3, and may have the low level in the bypass period P4 and the emission period P5. The compensation gate signal GC may transition from a deactivation level to an activation level in the initialization period P1, may transition from the activation level to the deactivation level in the compensation period P2, may have the deactivation level in the addressing period P3, may have the activation level in the bypass period P4, and may have the deactivation level in the emission period P5.

The emission signal EM may have an activation level in the initialization period P1, may transition from the activation level to a deactivation level in the compensation period P2, may have the deactivation level in the addressing period P3, and may have the activation level in the bypass period P4 and the emission period P5.

In the initialization period P1, the fourth transistor T4 may be turned on in response to the emission signal EM having the activation level, and the first power voltage ELVDD may be applied to the third node N3 through the fourth transistor T4 and the first transistor T1. Accordingly, the first terminal of the light-emitting element EL may be initialized by the first power voltage ELVDD in the initialization period P1.

In the compensation period P2, the second transistor T2 may be turned on in response to the write gate signal GW[n] having the activation level, and the reference voltage VREF may be applied to the first node N1 through the second transistor T2. In a period P2-1 in which the compensation gate signal GC has the activation level within the compensation period P2, the third transistor T3 may be turned on in response to the compensation gate signal GC having the activation level, and the sustain voltage VSUS having the high level may be applied to the third node N3 through the third transistor T3. In the period P2-1 in which the emission signal EM has the activation level within the compensation period P2, the fourth transistor T4 may be turned on in response to the emission signal EM having the activation level, and the first power voltage ELVDD having the low level may be applied to the second node N2 through the fourth transistor T4. In a period P2-2 in which the compensation gate signal GC and the emission signal EM have the deactivation level within the compensation period P2, a current may flow from the third node N3 to the second node N2 through the first transistor T1, and a voltage corresponding to a value VREF-VTH obtained by subtracting a threshold voltage VTH of the first transistor T1 from the reference voltage VREF may be applied to the second node N2. Accordingly, in the compensation period P2, the first capacitor CST may store the threshold voltage VTH of the first transistor T1.

In the addressing period P3, the second transistor T2 may be turned on in response to the pulse of the write gate signal GW[n] having the activation level, and the data voltage VDAT may be applied to the first node N1 through the second transistor T2. Accordingly, in the addressing period P3, the first capacitor CST may store a voltage corresponding to a value VDAT-VREF+VTH obtained by subtracting a value VREF-VTH obtained by subtracting the threshold voltage VTH of the first transistor T1 from the reference voltage VREF from the data voltage VDAT.

In the bypass period P4, the third transistor T3 may be turned on in response to the compensation gate signal GC, and the sustain voltage VSUS having the low level may be applied to the third node N3 through the third transistor T3. Accordingly, in the bypass period P4, charges stored in the first terminal of the light-emitting element EL by a parasitic capacitance of the light-emitting element EL may be discharged to a line that transmits the sustain voltage VSUS through the third transistor T3.

In the emission period P5, the fourth transistor T4 may be turned on in response to the emission signal EM, and the driving current generated by the first transistor T1 may flow to the light-emitting element EL through the fourth transistor T4 and the first transistor T1. The light-emitting element EL may emit light with a luminance corresponding to the magnitude of the driving current. The magnitude of the driving current may correspond to a value VDAT-VREF obtained by subtracting the threshold voltage VTH of the first transistor T1 from the voltage VDAT-VREF+VTH stored in the first capacitor CST connected between the gate and the first terminal of the first transistor T1. Accordingly, in the emission period P5, the light-emitting element EL may emit light with a luminance corresponding to the data voltage VDAT.

Figure 4:
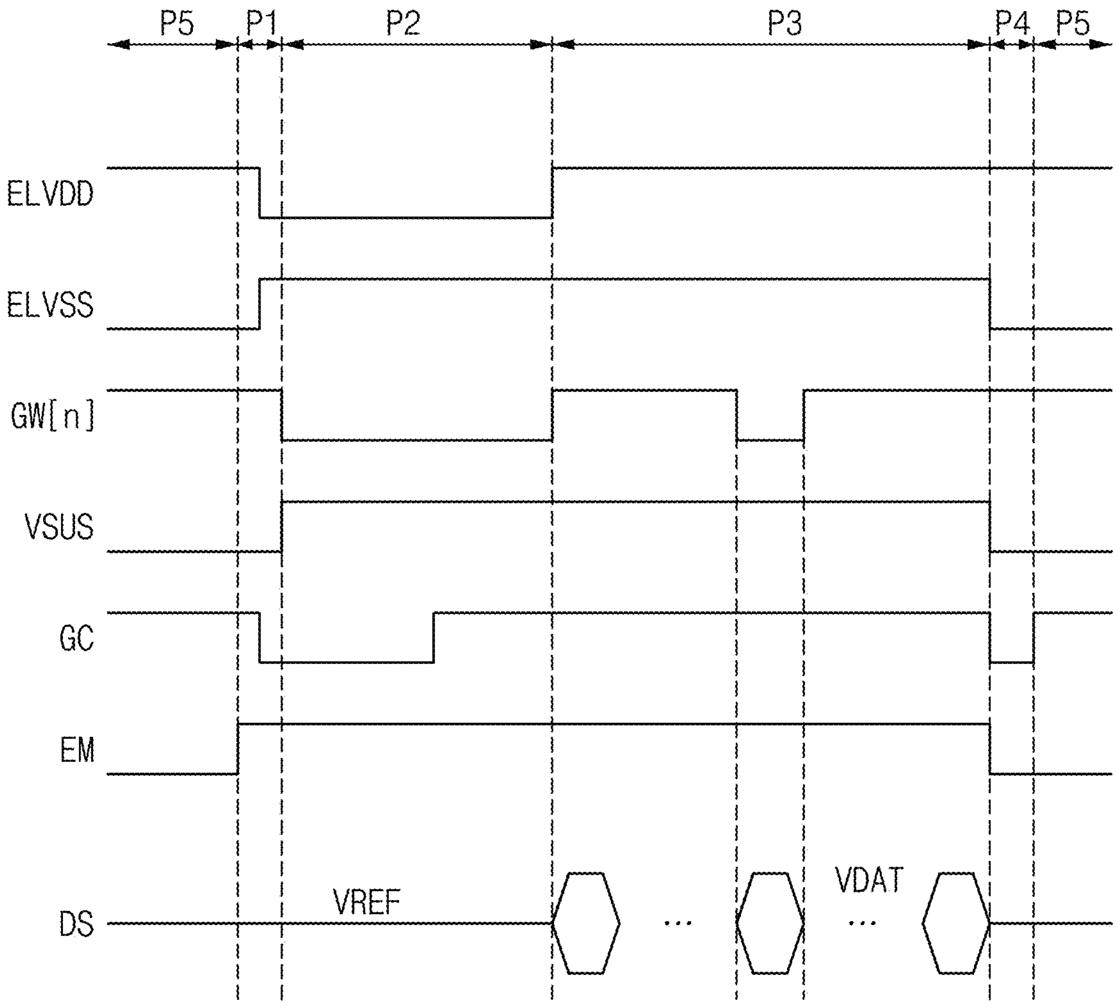
FIG. 4 is a timing diagram showing an example of the voltages and the signals of FIG. 2.

FIG. 4 is a timing diagram showing an example of the voltages ELVDD, ELVSS, and VSUS and the signals GW[n], GC, EM, and DS of FIG. 2.

Descriptions of steps of an operation of the pixel PX described with reference to FIGS. 2 and 4, which are substantially the same as or similar to those of the operation of the pixel PX described with reference to FIGS. 2 and 3, are omitted.

Referring to FIGS. 2 and 4, the emission signal EM may have the deactivation level in the initialization period P1, the compensation period P2, and the addressing period P3, and may have the activation level in the bypass period P4 and the emission period P5.

In the initialization period P1, the third transistor T3 may be turned on in response to the compensation gate signal GC having the activation level, and the sustain voltage VSUS having the low level may be applied to the third node N3 through the third transistor T3. Accordingly, the first terminal of the light-emitting element EL may be initialized by the sustain voltage VSUS having the low level in the initialization period P1.

In the compensation period P2, the second transistor T2 may be turned on in response to the write gate signal GW[n] having the activation level, and the reference voltage VREF may be applied to the first node N1 through the second transistor T2. In the compensation period P2, the third transistor T3 may be turned on in response to the compensation gate signal GC having the activation level, and the sustain voltage VSUS having the high level may be applied to the third node N3 through the third transistor T3. In the compensation period P2, a current may flow from the third node N3 to the second node N2 through the first transistor T1, and a voltage corresponding to a value VREF-VTH obtained by subtracting the threshold voltage VTH of the first transistor T1 from the reference voltage VREF may be applied to the second node N2. Accordingly, in the compensation period P2, the first capacitor CST may store the threshold voltage VTH of the first transistor T1.

Figure 5:
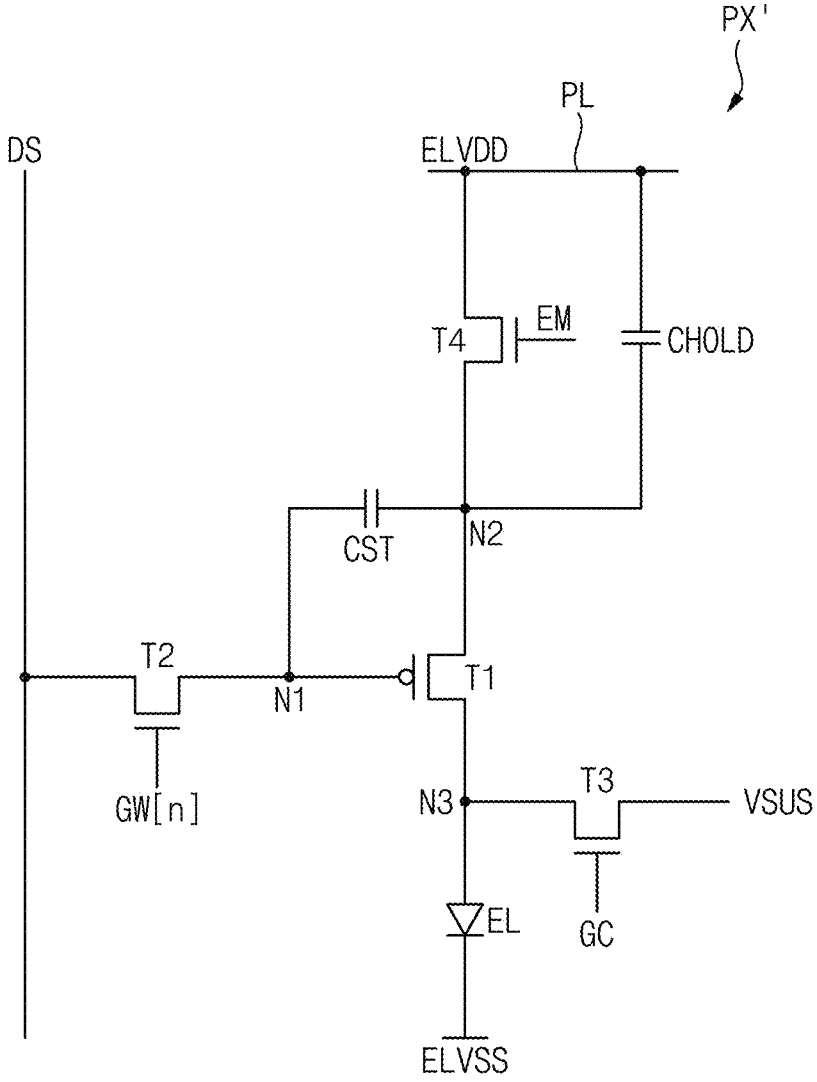
FIG. 5 is a circuit diagram showing an example of the pixel of FIG. 1.

FIG. 5 is a circuit diagram showing an example of the pixel PX' of FIG. 1.

Descriptions of components of the pixel PX described with reference to FIG. 5, which are substantially the same as or similar to those of the pixel PX described with reference to FIG. 2, are omitted.

Referring to FIG. 5, the first transistor T1 may be a PMOS transistor, and at least one of the second transistor T2, the third transistor T3, and the fourth transistor T4 may be an NMOS transistor. In an embodiment, as illustrated in FIG. 5, each of the second transistor T2, the third transistor T3, and the fourth transistor T4 may be an NMOS transistor. The first transistor T1 may be a polycrystalline silicon transistor, and each of the second transistor T2, the third transistor T3, and the fourth transistor T4 may be an oxide semiconductor transistor.

Figure 6:
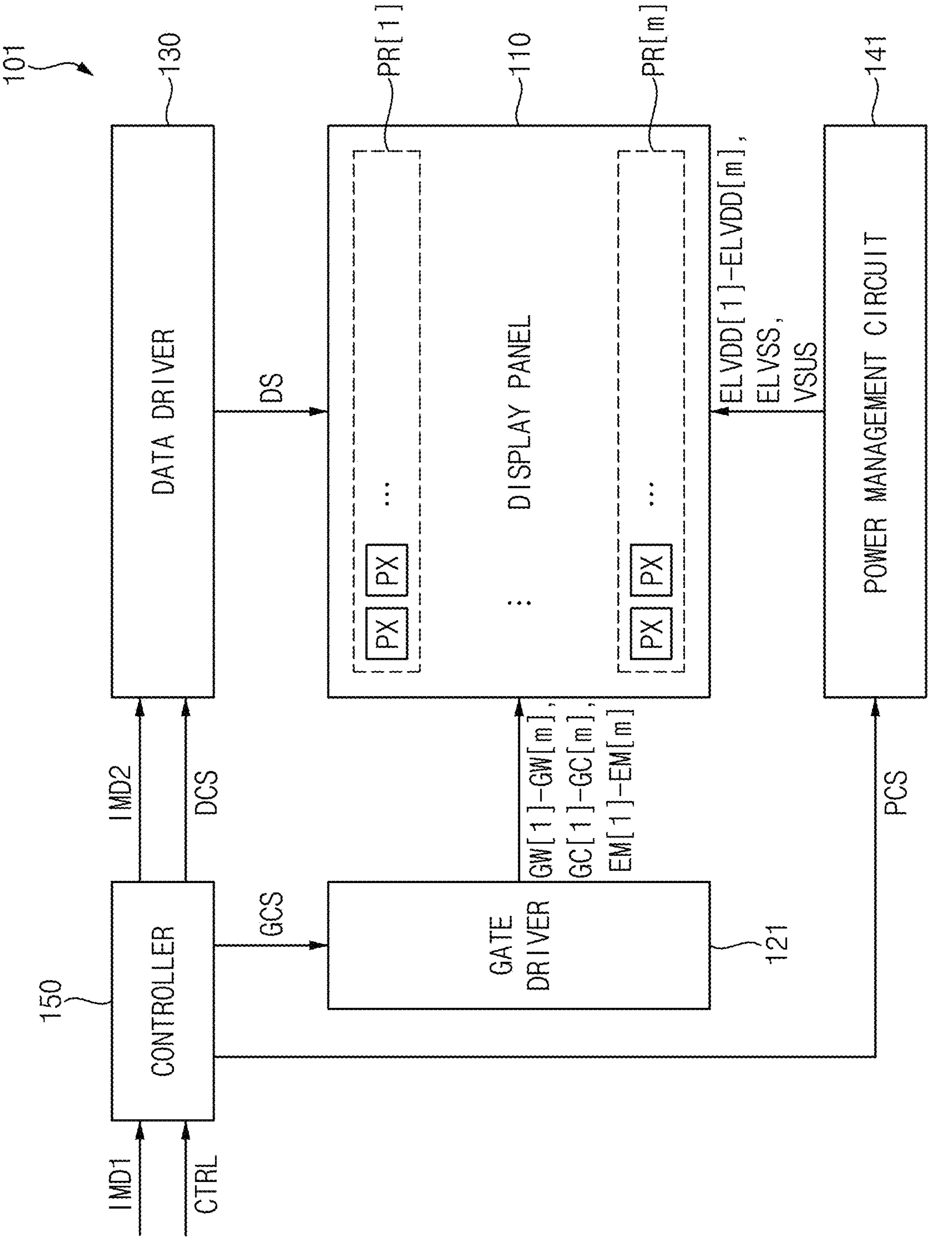
FIG. 6 is a block diagram showing a display device according to an embodiment.

FIG. 6 is a block diagram showing a display device 101 according to an embodiment.

Descriptions of components of the display device 101 described with reference to FIG. 6, which are substantially the same as or similar to those the display device 100 described with reference to FIG. 1, are omitted.

Referring to FIG. 6, the display device 101 may include a display panel 110, a gate driver 121, a data driver 130, a power management circuit 141, and a controller 150.

The gate driver 121 may provide first to $m^{th}$ write gate signals GW[1]-GW[m], first to $m^{th}$ compensation gate signals GC[1]-GC[m], and first to $m^{th}$ emission signals EM[1]-EM[m] to the pixels PX. The gate driver 121 may generate the first to $m^{th}$ write gate signals GW[1]-GW[m], the first to $m^{th}$ compensation gate signals GC[1]-GC[m], and the first to $m^{th}$ emission signals EM[1]-EM[m] based on the gate control signal GCS.

The gate driver 121 may sequentially provide the first to $m^{th}$ compensation gate signals GC[1]-GC[m] to first to $m^{th}$ pixel rows PR[1]-PR[m]. In other words, the gate driver 121 may provide the first compensation gate signal GC[1] to the first pixel row PR[1], and may provide the $m^{th}$ compensation gate signal GC[m] to the $m^{th}$ pixel row PR[m]. The gate driver 121 may sequentially provide the first to $m^{th}$ emission signals EM[1]-EM[m] to the first to $m^{th}$ pixel rows PR[1]-PR[m]. In other words, the gate driver 121 may provide the first emission signal EM[1] to the first pixel row PR[1], and may provide the $m^{th}$ emission signal EM[m] to the $m^{th}$ pixel row PR[m].

The power management circuit 141 may provide first to $m^{th}$ first power voltages ELVDD[1]-ELVDD[m], a second power voltage ELVSS, and a sustain voltage VSUS to the pixels PX. The power management circuit 141 may generate the first to $m^{th}$ first power voltages ELVDD[1]-ELVDD[m], the second power voltage ELVSS, and the sustain voltage VSUS based on the power control signal PCS. The power management circuit 141 may sequentially provide the first to $m^{th}$ first power voltages ELVDD[1]-ELVDD[m] to the first to $m^{th}$ pixel rows PR[1]-PR[m]. In other words, the power management circuit 141 may provide the first first power voltage ELVDD[1] to the first pixel row PR[1], and may provide the $m^{th}$ first power voltage ELVDD[m] to the $m^{th}$ pixel row PR[m].

Figure 7:
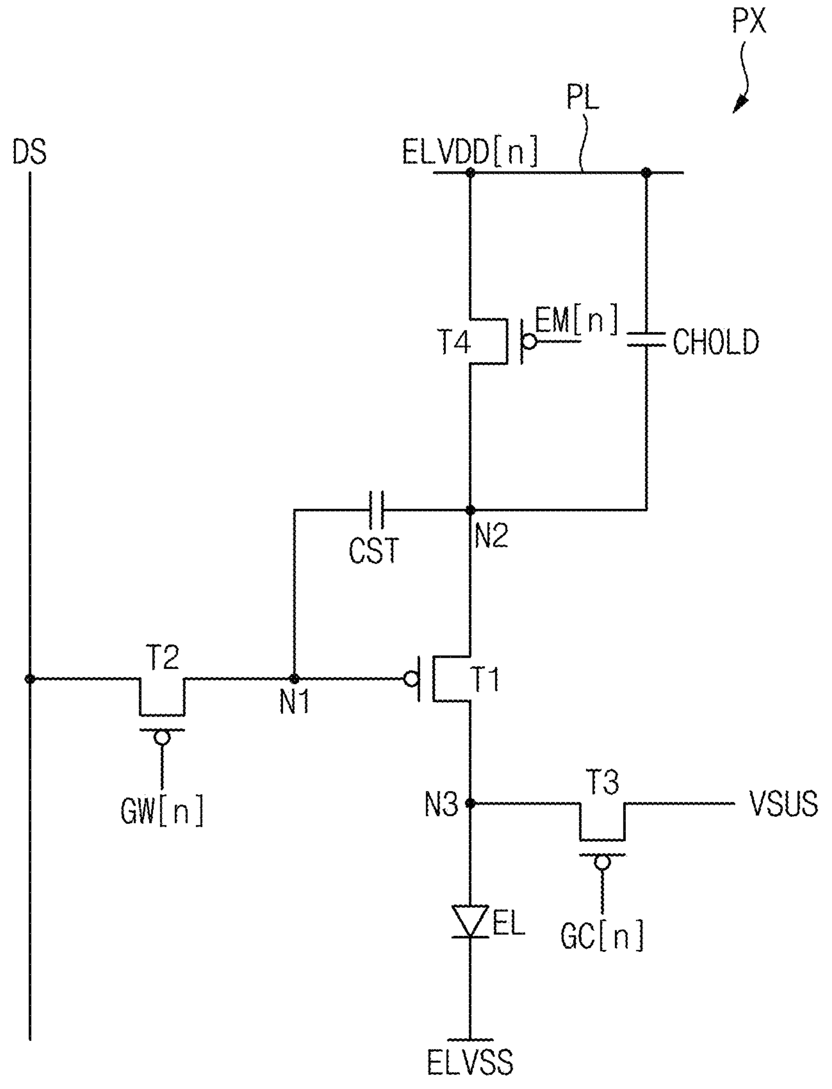
FIG. 7 is a circuit diagram showing an example of a pixel of FIG. 6.

FIG. 7 is a circuit diagram showing an example of the pixel PX of FIG. 6.

Descriptions of components of the pixel PX described with reference to FIG. 7, which are substantially the same as or similar to those of the pixel PX described with reference to FIG. 2, are omitted.

Referring to FIGS. 6 and 7, the pixel PX may receive a write gate signal GW[n], a compensation gate signal GC[n], an emission signal EM[n], a data signal DS, a first power voltage ELVDD[n], the second power voltage ELVSS, and the sustain voltage VSUS. The compensation gate signal GC[n] may be one of the first to $m^{th}$ compensation gate signals GC[1]-GC[m], the emission signal EM[n] may be one of the first to $m^{th}$ emission signals EM[1]-EM[m], and the first power voltage ELVDD[n] may be one of the first to $m^{th}$ first power voltages ELVDD[1]-ELVDD[m].

The third transistor T3 may transmit the sustain voltage VSUS to the third node N3 in response to the compensation gate signal GC[n]. The third transistor T3 may include a gate that receives the compensation gate signal GC[n], a first terminal that receives the sustain voltage VSUS, and a second terminal connected to the third node N3.

The fourth transistor T4 may transmit the first power voltage ELVDD[n] to the second node N2 in response to the emission signal EM[n]. The fourth transistor T4 may include a gate that receives the emission signal EM[n], a first terminal that receives the first power voltage ELVDD[n], and a second terminal connected to the second node N2.

Figure 8:
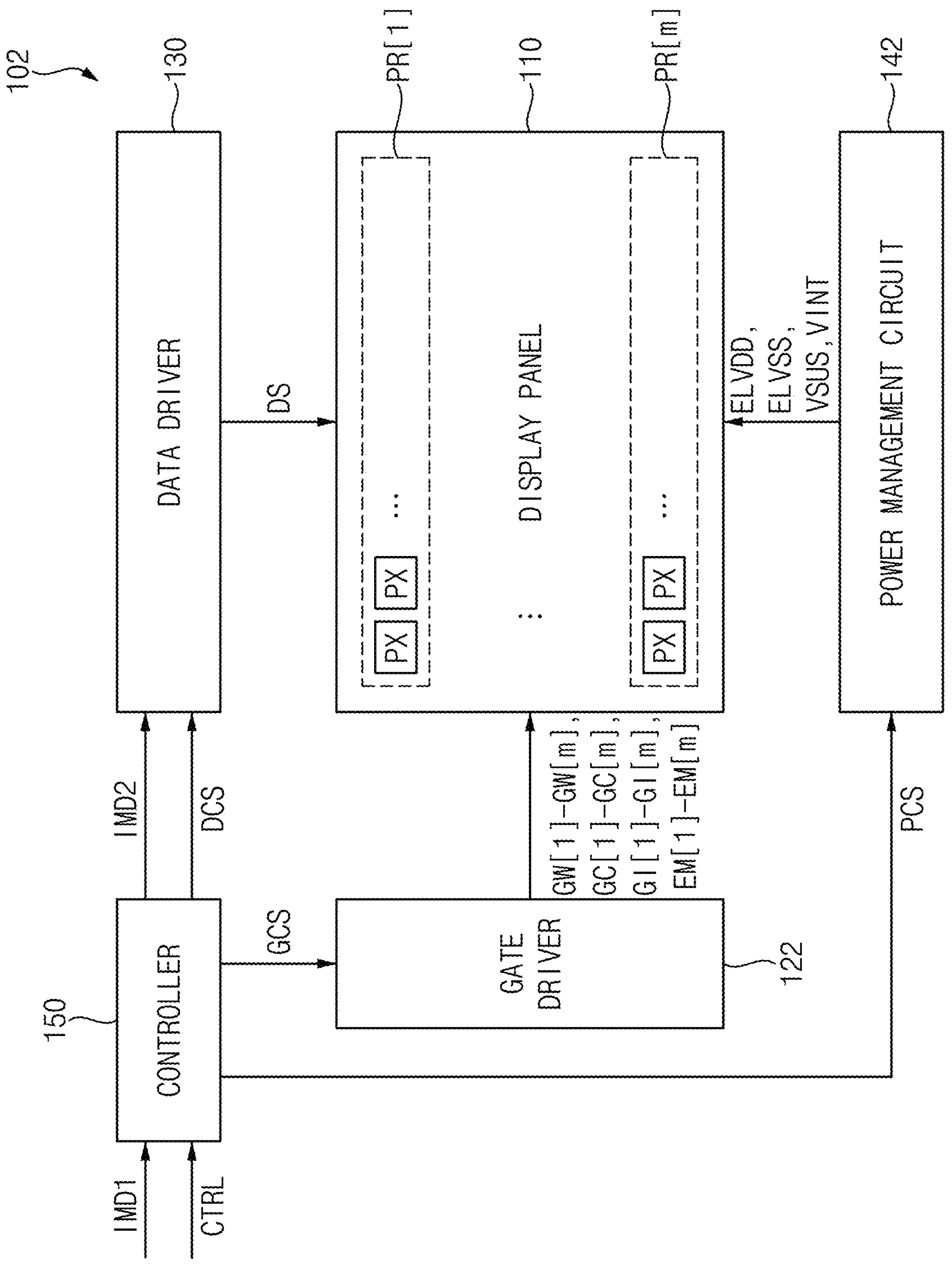
FIG. 8 is a block diagram showing a display device according to an embodiment.

FIG. 8 is a block diagram showing a display device 102 according to an embodiment.

Descriptions of components of the display device 102 described with reference to FIG. 8, which are substantially the same as or similar to those of the display device 100 described with reference to FIG. 1 and/or the display device 101 described with reference to FIG. 6, are omitted.

Referring to FIG. 8, the display device 102 may include a display panel 110, a gate driver 122, a data driver 130, a power management circuit 142, and a controller 150.

The gate driver 122 may provide first to $m^{th}$ write gate signals GW[1]-GW[m], first to $m^{th}$ compensation gate signals GC[1]-GC[m], first to $m^{th}$ initialization gate signals GI[1]-GI[m], and first to $m^{th}$ emission signals EM[1]-EM[m] to the pixels PX. The gate driver 122 may generate the first to $m^{th}$ write gate signals GW[1]-GW[m], the first to $m^{th}$ compensation gate signals GC[1]-GC[m], the first to $m^{th}$ initialization gate signals GI[1]-GI[m], and the first to $m^{th}$ emission signals EM[1]-EM[m] based on the gate control signal GCS.

The gate driver 122 may sequentially provide the first to $m^{th}$ initialization gate signals GI[1]-GI[m] to the first to $m^{th}$ pixel rows PR[1]-PR[m]. In other words, the gate driver 122 may provide the first initialization gate signal GI[1] to the first pixel row PR[1], and may provide the $m^{th}$ initialization gate signal GI[m] to the $m^{th}$ pixel row PR[m].

The power management circuit 142 may provide a first power voltage ELVDD, a second power voltage ELVSS, a sustain voltage VSUS, and an initialization voltage VINT to the pixels PX. The power management circuit 142 may generate the first power voltage ELVDD, the second power voltage ELVSS, the sustain voltage VSUS, and the initialization voltage VINT based on a power control signal PCS. The power management circuit 142 may commonly provide the initialization voltage VINT to the first to $m^{th}$ pixel rows PR[1]-PR[m].

Figure 9:
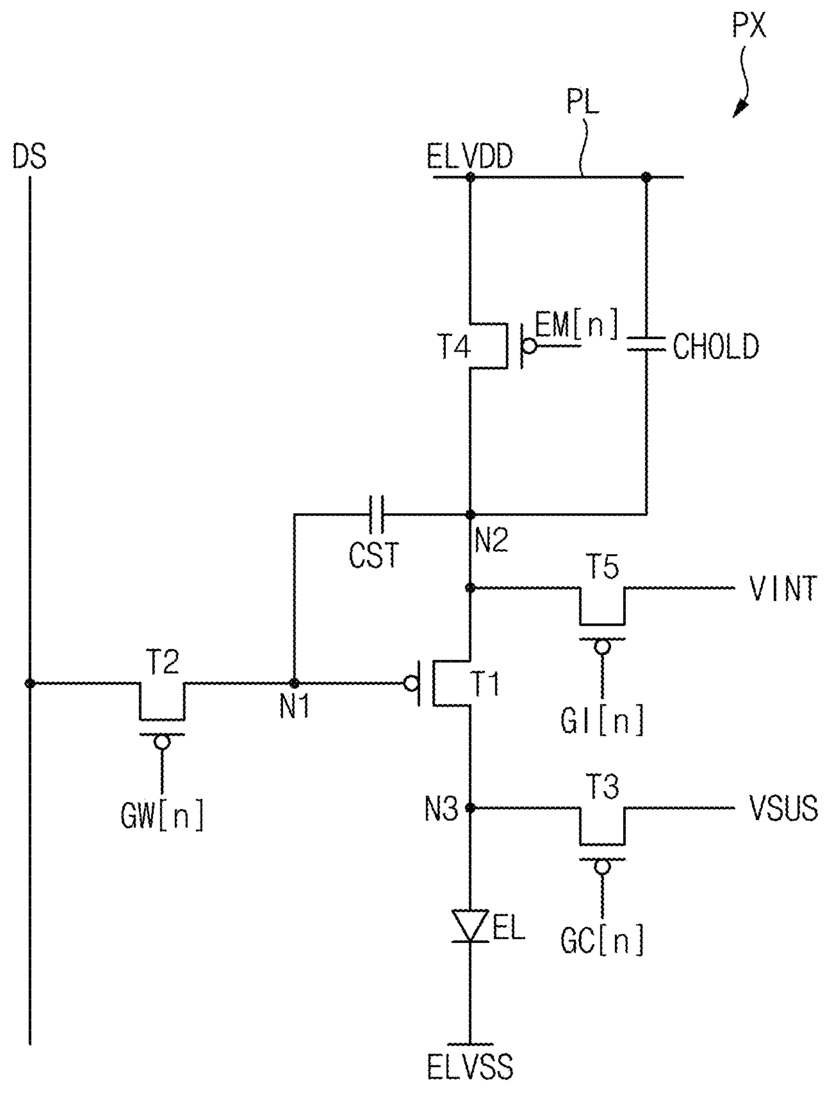
FIG. 9 is a circuit diagram showing an example of a pixel of FIG. 8.

FIG. 9 is a circuit diagram showing an example of the pixel PX of FIG. 8.

Descriptions of components of the pixel PX described with reference to FIG. 9, which are substantially the same as or similar to those of the pixel PX described with reference to FIG. 2 and/or the pixel PX described with reference to FIG. 7, are omitted.

Referring to FIGS. 8 and 9, the pixel PX may receive a write gate signal GW[n], a compensation gate signal GC[n], an initialization gate signal GI[n], an emission signal EM[n], a data signal DS, the first power voltage ELVDD, the second power voltage ELVSS, the sustain voltage VSUS, and the initialization voltage VINT. The initialization gate signal GI[n] may be one of the first to $m^{th}$ initialization gate signals GI[1]-GI[m].

The pixel PX may include a first transistor T1, a second transistor T2, a third transistor T3, a fourth transistor T4, a fifth transistor T5, a first capacitor CST, a second capacitor CHOLD, and a light-emitting element EL.

The fifth transistor T5 may transmit the initialization voltage VINT to a second node N2 in response to the initialization gate signal GI[n]. The fifth transistor T5 may include a gate that receives the initialization gate signal GI[n], a first terminal that receives the initialization voltage VINT, and a second terminal connected to the second node N2.

The pixel PX according to the present embodiment includes only five transistors and two capacitors, so that the area of the pixel PX may be reduced. Further, the display device 102 according to the present embodiment includes the pixels PX having a small area, so that the resolution of the display device 102 may increase.

Figure 10:
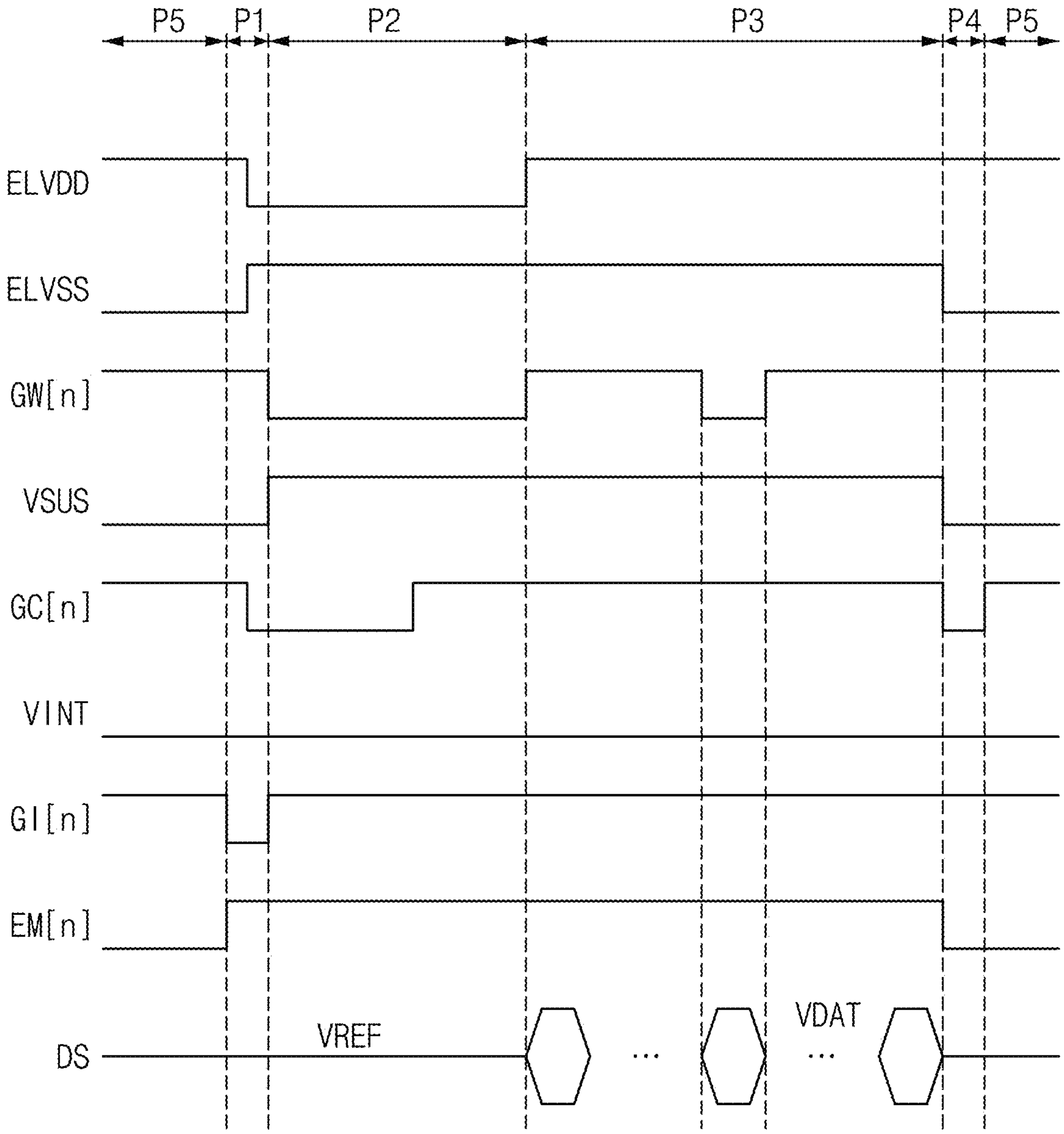
FIG. 10 is a timing diagram showing an example of the voltages and the signals of FIG. 9.

FIG. 10 is a timing diagram showing an example of the voltages ELVDD, ELVSS, VSUS, and VINT and the signals GW[n], GC[n], GI[n], EM[n], and DS of FIG. 9.

Descriptions of steps of an operation of the pixel PX described with reference to FIGS. 9 and 10, which are substantially the same as or similar to those of the operation of the pixel PX described with reference to FIGS. 2 and 3 and/or the operation of the pixel PX described with reference to FIGS. 2 and 4, are omitted.

The initialization voltage VINT may have a low level in an initialization period P1, a compensation period P2, an addressing period P3, a bypass period P4, and an emission period P5. In other words, the initialization voltage VINT may be a direct current (DC) voltage. The initialization gate signal GI[n] may have an activation level in the initialization period P1, and a deactivation level in the compensation period P2, the addressing period P3, the bypass period P4, and the emission period P5.

In the initialization period P1, the fifth transistor T5 may be turned on in response to the initialization gate signal GI[n] having the activation level, and the initialization voltage VINT may be applied to the third node N3 through the fifth transistor T5 and the first transistor T1. Accordingly, the first terminal of the light-emitting element EL may be initialized by the initialization voltage VINT in the initialization period P1.

Figure 11:
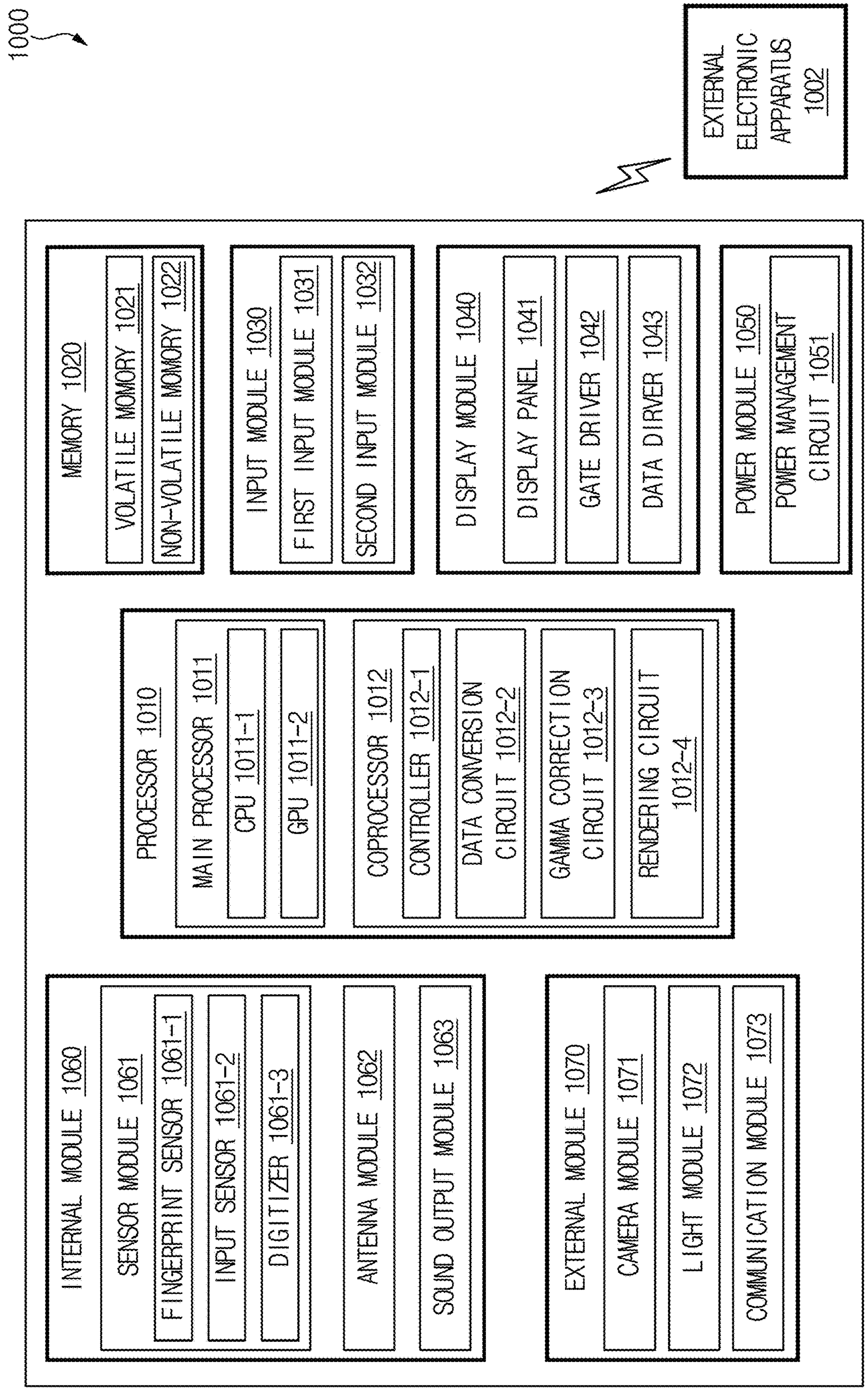
FIG. 11 is a block diagram showing an electronic apparatus according to an embodiment.

FIG. 11 is a block diagram showing an electronic apparatus 1000 according to an embodiment.

Referring to FIG. 11, the electronic apparatus 1000 may output various information through a display module 1040 within an operating system. When a processor 1010 executes an application stored in a memory 1020, the display module 1040 may provide application information to a user through a display panel 1041. In other words, the processor 1010 may control the display module 1040. In an embodiment, the processor 1010 may provide the input image data IMG1 of FIGS. 1, 6, and 8 and the control signal CTRL of FIGS. 1, 6, and 8 to the display module 1040.

The processor 1010 may obtain an external input through an input module 1030 or a sensor module 1061, and may execute an application corresponding to the external input. For example, when the user selects a camera icon displayed on the display panel 1041, the processor 1010 may obtain a user input through an input sensor 1061-2, and may activate a camera module 1071. The processor 1010 may transmit image data corresponding to a captured image acquired through the camera module 1071 to the display module 1040. The display module 1040 may display an image corresponding to the captured image through the display panel 1041. Some of components of the electronic apparatus 1000 may be integrated and provided as one component, or one component may be provided separately into two or more components.

The electronic apparatus 1000 may communicate with an external electronic apparatus 1002 through a network (e.g., a short-range wireless communication network or a long-range wireless communication network). In an embodiment, the electronic apparatus 1000 may include the processor 1010, the memory 1020, the input module 1030, the display module 1040, a power module 1050, an internal module 1060, and an external module 1070. In an embodiment, the electronic apparatus 1000 may omit at least one of the above-described components, or one or more other components may be added. In an embodiment, some of the above-described components (e.g., the sensor module 1061, an antenna module 1062, or a sound output module 1063) may be integrated into another component (e.g., the display module 1040).

The processor 1010 may execute software to control at least one other component (e.g., hardware or software component) of the electronic apparatus 1000 connected to the processor 1010, and may perform various data processing or calculation. In an embodiment, as at least part of data processing or calculation, the processor 1010 may store commands or data received from another component (e.g., the input module 1030, the sensor module 1061, or a communication module 1073) in a volatile memory 1021, may process the commands or data stored in the volatile memory 1021, and may store resultant data in a non-volatile memory 1022.

The processor 1010 may include a main processor 1011 and a coprocessor 1012. The main processor 1011 may include one or more of a central processing unit (CPU) 1011-1 or an application processor (AP). The main processor 1011 may further include one or more of a graphics processing unit (GPU) 1011-2, a communication processor (CP), and an image signal processor (ISP). At least two of the above-described processing unit and processor may be implemented as an integrated component (e.g., a single chip), or each may be implemented as an independent component (e.g., a plurality of chips).

The coprocessor 1012 may include a controller 1012-1. The controller 1012-1 may include an interface conversion circuit and a timing control circuit. The controller 1012-1 may receive an image signal from the main processor 1011, may convert data format of the image signal to suit the interface specifications with the display module 1040, and may output image data. The controller 1012-1 may output various control signals necessary for driving the display module 1040.

The coprocessor 1012 may further include a data conversion circuit 1012-2, a gamma correction circuit 1012-3, a rendering circuit 1012-4, etc. The data conversion circuit 1012-2 may receive the image data from the controller 1012-1, and may compensate the image data such that the image is displayed at a desired luminance according to the characteristics of the electronic apparatus 1000 or the user's settings or may convert the image data to reduce power consumption or compensate for afterimages. The gamma correction circuit 1012-3 may convert the image data or a gamma reference voltage such that an image displayed on the electronic apparatus 1000 has desired gamma characteristics. The rendering circuit 1012-4 may receive the image data from the controller 1012-1, and may render the image data by considering a pixel arrangement of the display panel 1041 applied to the electronic apparatus 1000. At least one of the data conversion circuit 1012-2, the gamma correction circuit 1012-3, and the rendering circuit 1012-4 may be integrated into another component (e.g., the main processor 1011 or a controller). At least one of the data conversion circuit 1012-2, the gamma correction circuit 1012-3, and the rendering circuit 1012-4 may be integrated into a data driver 1043 to be described below.

The memory 1020 may store various data used by at least one component of the electronic apparatus 1000 (e.g., the processor 1010 or the sensor module 1061) and input data or output data for commands related thereto. The memory 1020 may include at least one of the volatile memory 1021 and the non-volatile memory 1022.

The input module 1030 may receive commands or data to be used in components of the electronic apparatus 1000 (e.g., the processor 1010, the sensor module 1061, or the sound output module 1063) from the outside of the electronic apparatus 1000 (e.g., the user or the external electronic apparatus 1002).

The input module 1030 may include a first input module 1031 through which commands or data are input from the user, and a second input module 1032 through which command or data are input from the external electronic apparatus 1002. The first input module 1031 may include a microphone, a mouse, a keyboard, a key (e.g., button), or a pen (e.g., passive pen or active pen). The second input module 1032 may support a designated protocol that may connect to the external electronic apparatus 1002 by wire or wirelessly. In an embodiment, the second input module 1032 may include a high definition multimedia interface (HDMI), a universal serial bus (USB) interface, an SD card interface, or an audio interface. The second input module 1032 may include a connector that may be physically connected to the external electronic apparatus 1002, for example, an HDMI connector, a USB connector, an SD card connector, or an audio connector (e.g., a headphone connector).

The display module 1040 may provide visual information to the user. The display module 1040 may include the display panel 1041, a gate driver 1042, and the data driver 1043. The display module 1040 may further include a window, a chassis, and a bracket to protect the display panel 1041. The display module 1040 may correspond to the display device 100 of FIG. 1, the display device 101 of FIG. 6, and the display device 102 of FIG. 8. The display panel 1041 may correspond to the display panel 110 of FIGS. 1, 6, and 8, the gate driver 1042 may correspond to the gate driver 120 of FIG. 1, the gate driver 121 of FIG. 6, and the gate driver 122 of FIG. 8, and the data driver 1043 may correspond to the data driver 130 of FIGS. 1, 6, and 8.

The power module 1050 may supply power to components of the electronic apparatus 1000. The power module 1050 may include a battery that charges power voltage. The battery may include a non-rechargeable primary cell, a rechargeable secondary cell, or a fuel cell. The power module 1050 may include a power management circuit 1051. The power management circuit 1051 may supply optimized power to each of the above-described modules and the modules described below. The power management circuit 1051 may correspond to the power management circuit 140 of FIG. 1, the power management circuit 141 of FIG. 6, and the power management circuit 142 of FIG. 8. The power module 1050 may include a wireless power transmission/reception member electrically connected to the battery. The wireless power transmission/reception member may include a plurality of coil-shaped antenna radiators.

The electronic apparatus 1000 may further include the internal module 1060 and the external module 1070. The internal module 1060 may include the sensor module 1061, the antenna module 1062, and the sound output module 1063. The external module 1070 may include the camera module 1071, a light module 1072, and the communication module 1073.

The sensor module 1061 may detect an input by the user's body or an input by the pen among the first input module 1031, and may generate an electrical signal or a data value corresponding to the input. The sensor module 1061 may include at least one of a fingerprint sensor 1061-1, the input sensor 1061-2, and a digitizer 1061-3.

The processor 1010 may output commands or data to the display module 1040, the sound output module 1063, the camera module 1071, or the light module 1072 based on the input data received from the input module 1030. For example, the processor 1010 may generate image data in response to input data applied through the mouse or the active pen and output the image data to the display module 1040, or may generate command data in response to the input data to output the command data to the camera module 1071 or the light module 1072. When no input data is received from the input module 1030 for a certain period of time, the processor 1010 may switch an operation mode of the electronic apparatus 1000 to a low-power mode or a sleep mode to reduce power consumption of the electronic apparatus 1000.

The processor 1010 may output commands or data to the display module 1040, the sound output module 1063, the camera module 1071, or the light module 1072 based on sensing data received from the sensor module 1061. For example, the processor 1010 may compare authentication data authorized by the fingerprint sensor 1061-1 with authentication data stored in the memory 1020, and then may execute an application according to the comparison result. The processor 1010 may execute command or output corresponding image data to the display module 1040 based on sensing data detected by the input sensor 1061-2 or the digitizer 1061-3. When the sensor module 1061 includes a temperature sensor, the processor 1010 may receive temperature data for a temperature measured from the sensor module 1061, and may further perform luminance correction for the image data or the like based on the temperature data.

The display device according to the embodiments may be applied to a display device included in a computer, a notebook, a mobile phone, a smart phone, a smart pad, a smart watch, a PMP, a PDA, an MP3 player, or the like.

Although the pixel, the display device, and the electronic apparatus according to the embodiments have been described with reference to the drawings, the illustrated embodiments are examples, and may be modified and changed by a person having ordinary knowledge in the relevant technical field without departing from the technical spirit described in the following claims.

What is claimed is:

1. A pixel comprising:

a first transistor including a gate connected to a first node, a first terminal connected to a second node, and a second terminal connected to a third node;

a second transistor which transmits a data signal to the first node in response to a write gate signal;

a third transistor which transmits a sustain voltage to the third node in response to a compensation gate signal;

a fourth transistor which transmits a first power voltage to the second node in response to an emission signal;

a first capacitor connected between the first node and the second node;

a second capacitor connected between the second node and a power line which transmits the first power voltage; and a light-emitting element including a first terminal connected to the third node and a second terminal which receives a second power voltage, wherein, in an initialization period, the first power voltage transitions from a high level to a low level, the second power voltage transitions from a low level to a high level, the compensation gate signal transitions from a deactivation level to an activation level, and the emission signal has an activation level.

2. The pixel of claim 1, wherein the first power voltage is applied to the third node through the fourth transistor and the first transistor in the initialization period.

3. The pixel of claim 1, wherein, in a compensation period after the initialization period, the write gate signal has an activation level, the sustain voltage has a high level, the compensation gate signal transitions from the activation level to the deactivation level, the emission signal transitions from the activation level to a deactivation level, and the data signal has a reference voltage.

4. The pixel of claim 3, wherein the first capacitor stores a threshold voltage of the first transistor in the compensation period.

5. The pixel of claim 3, wherein, in an addressing period after the compensation period, the write gate signal includes a pulse having the activation level, and the data signal has a data voltage.

6. The pixel of claim 5, wherein, in a bypass period after the addressing period, the sustain voltage has a low level, and the compensation gate signal has the activation level.

7. The pixel of claim 6, wherein, in an emission period after the bypass period, the first power voltage has the high level, the second power voltage has the low level, and the emission signal has the activation level.

8. The pixel of claim 1, wherein, in the initialization period, the first power voltage transitions from a high level to a low level, the second power voltage transitions from a low level to a high level, when the sustain voltage has a low level, the compensation gate signal transitions from a deactivation level to an activation level, and the emission signal has a deactivation level.

9. The pixel of claim 8, wherein the sustain voltage is applied to the third node through the third transistor in the initialization period.

10. The pixel of claim 1, wherein each of the first transistor, the second transistor, the third transistor, and the fourth transistor is a p-type metal oxide semiconductor (PMOS) transistor.

11. The pixel of claim 1, wherein the first transistor is a p-type metal oxide semiconductor (PMOS) transistor, and wherein at least one of the second transistor, the third transistor, and the fourth transistor is an n-type metal oxide semiconductor (NMOS) transistor.

12. The pixel of claim 1, further comprising:

a fifth transistor which transmits an initialization voltage to the second node in response to an initialization gate signal.

13. The pixel of claim 12, wherein, in the initialization period, the first power voltage transitions from a high level to a low level, the second power voltage transitions from a low level to a high level, the compensation gate signal transitions from a deactivation level to an activation level, the emission signal has a deactivation level, when the initialization gate signal has an activation level.

14. The pixel of claim 13, wherein the initialization voltage is applied to the third node through the fifth transistor and the first transistor in the initialization period.

15. A display device comprising:

a display panel including a plurality of pixels;

a gate driver which provides a write gate signal, a compensation gate signal, and an emission signal to each of the pixels;

a data driver which provides a data signal to each of the pixels; and a power management circuit which provides a first power voltage, a second power voltage, and a sustain voltage to each of the pixels, wherein each of the pixels comprises:

a first transistor including a gate connected to a first node, a first terminal connected to a second node, and a second terminal connected to a third node;

a second transistor which transmits the data signal to the first node in response to the write gate signal;

a third transistor which transmits the sustain voltage to the third node in response to the compensation gate signal;

a fourth transistor which transmits the first power voltage to the second node in response to the emission signal;

a fifth transistor which transmits an initialization voltage to the second node in response to an initialization gate signal;

a first capacitor connected between the first node and the second node;

a second capacitor connected between the second node and a power line which transmits the first power voltage; and a light-emitting element including a first terminal connected to the third node and a second terminal which receives the second power voltage.

16. The display device of claim 15, wherein the gate driver sequentially provides the write gate signal to pixel rows, and commonly provides the compensation gate signal and the emission signal to the pixel rows, and wherein the power management circuit commonly provides the first power voltage to the pixel rows.

17. The display device of claim 15, wherein the gate driver sequentially provides the write gate signal, the compensation gate signal, and the emission signal to pixel rows, and wherein the power management circuit sequentially provides the first power voltage to the pixel rows.

18. The display device of claim 15, wherein the gate driver further provides the initialization gate signal to each of the pixels, wherein the power management circuit further provides the initialization voltage to each of the pixels.

19. An electronic apparatus comprising:

a display panel including a plurality of pixels;

a gate driver which provides a write gate signal, a compensation gate signal, and an emission signal to each of the pixels;

a data driver which provides a data signal to each of the pixels;

a power management circuit which provides a first power voltage, a second power voltage, and a sustain voltage to each of the pixels;

a controller which controls the gate driver, the data driver, and the power management circuit; and a processor which provides input image data and a control signal to the controller, wherein each of the pixels comprises:

a first transistor including a gate connected to a first node, a first terminal connected to a second node, and a second terminal connected to a third node;

a second transistor which transmits the data signal to the first node in response to the write gate signal;

a third transistor which transmits the sustain voltage to the third node in response to the compensation gate signal;

a fourth transistor which transmits the first power voltage to the second node in response to the emission signal;

a fifth transistor which transmits an initialization voltage to the second node in response to an initialization gate signal;

a first capacitor connected between the first node and the second node;

a second capacitor connected between the second node and a power line which transmits the first power voltage; and a light-emitting element including a first terminal connected to the third node and a second terminal which receives the second power voltage.

* * * * *